US010637344B2

(12) United States Patent
Tomioka et al.

(10) Patent No.: US 10,637,344 B2
(45) Date of Patent: Apr. 28, 2020

(54) VOLTAGE REGULATOR

(71) Applicant: ABLIC Inc., Chiba-shi, Chiba (JP)

(72) Inventors: Tsutomu Tomioka, Chiba (JP); Masakazu Sugiura, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 16/156,501

(22) Filed: Oct. 10, 2018

(65) Prior Publication Data

US 2019/0115821 A1  Apr. 18, 2019

(30) Foreign Application Priority Data

Oct. 13, 2017 (JP) .................. 2017-199589

(51) Int. Cl.
*H02M 1/08* (2006.01)
*H02M 3/156* (2006.01)
*G05F 1/10* (2006.01)
*H02M 1/00* (2006.01)

(52) U.S. Cl.
CPC ............... *H02M 1/08* (2013.01); *G05F 1/10* (2013.01); *H02M 3/156* (2013.01); *H02M 2001/0003* (2013.01)

(58) Field of Classification Search
CPC ........ H02M 1/08; H02M 1/081; H02M 3/156; H02M 3/158; H02M 3/1588; H02M 2001/0003; H02M 2001/0006; H02M 2001/0016; H02M 2001/0025; H02M 2001/0026; G05F 3/08; G05F 3/10; G05F 3/16; G05F 3/20; G05F 3/205; G05F 3/22; G05F 3/24; G05F 3/26; G05F 3/262; G05F 3/265; G05F 3/267; G05F 3/222; G05F 3/225; G05F 3/242; G05F 3/245; G05F 3/30; G05F 1/56; G05F 1/563; G05F 1/565; G05F 1/567; G05F 1/575; G05F 1/561; G05F 1/562; G05F 1/10; G05F 1/46; G05F 1/461; G05F 1/462; G05F 1/463
USPC ................ 323/223–226, 266, 269–275, 281, 323/282–285, 299, 303, 311–317, 351, 323/907, 908; 327/538–543; 330/252–261

See application file for complete search history.

(56) References Cited

U.S. PATENT DOCUMENTS

| | | | |
|---|---|---|---|
| 6,297,624 B1 * | 10/2001 | Mitsui | G05F 1/465 323/314 |
| 7,446,514 B1 * | 11/2008 | Li | G05F 1/575 323/280 |
| 7,633,280 B2 | 12/2009 | Ivanov et al. | |
| 9,874,889 B1 * | 1/2018 | Zhao | G05F 1/575 |

(Continued)

FOREIGN PATENT DOCUMENTS

JP           4582705           9/2010

*Primary Examiner* — Gary L Laxton
*Assistant Examiner* — Carlos O Rivera-Perez
(74) *Attorney, Agent, or Firm* — Brinks Gilson & Lione (57) ABSTRACT

A source-grounded amplifier circuit supplied with a signal of an error amplifier circuit, and an output transistor supplied with a control voltage of the source-grounded amplifier circuit are provided. The source-grounded amplifier circuit has, in a signal path, a current limiting circuit including a cascode circuit controlled by a voltage having a positive temperature coefficient. A voltage regulator capable of reducing a dropout voltage of an output voltage without exceeding a gate breakdown voltage of the output transistor is provided.

6 Claims, 6 Drawing Sheets

(56) References Cited

U.S. PATENT DOCUMENTS

2009/0201618 A1* 8/2009 Hasegawa ............... G05F 1/573
361/93.9
2011/0109373 A1* 5/2011 Chen ........................ G05F 3/16
327/513

* cited by examiner

VOLTAGE REGULATOR

RELATED APPLICATIONS

This application claims priority under 35 U.S.C. § 119 to Japanese Patent Application No. 2017-199589 filed on Oct. 13, 2017, the entire content of which is hereby incorporated by reference.

BACKGROUND OF THE INVENTION

1. Field of the Invention

The present invention relates to a voltage regulator.

2. Description of the Related Art

There has been known a voltage regulator of related art which is equipped with an error amplifier circuit comparing a reference voltage with an output voltage, a second-stage amplifier circuit composed of a resistor and a transistor and amplifying a voltage output from the error amplifier circuit, and an output transistor controlled by the voltage output from the second-stage amplifier circuit and providing the output voltage, and in which in order to limit a gate voltage of the output transistor so that the gate voltage does not exceed its gate breakdown voltage, a voltage control transistor whose gate is applied with a constant voltage is provided between a drain of the transistor in the second-stage amplifier circuit and a gate of the output transistor (refer to, for example, U.S. Pat. No. 7,633,280).

SUMMARY OF THE INVENTION

In the voltage regulator of related art provided with the voltage control transistor, since a drain current of the voltage control transistor whose gate is applied with a constant voltage sufficiently larger than its threshold voltage has a negative temperature coefficient, the gate voltage of the output transistor is reduced at a low temperature. Accordingly, it is not possible to increase the constant voltage applied to the gate of the voltage control transistor when taking into consideration the time of the low temperature. Therefore, it was difficult to reduce a dropout voltage of the output voltage.

The present invention has been made in view of the above difficulty, and provides a voltage regulator capable of reducing a dropout voltage of an output voltage without exceeding a gate breakdown voltage of an output transistor.

There is provided a voltage regulator according to one aspect of the present invention which includes: an error amplifier circuit configured to output a signal obtained by amplifying a difference between a voltage based on an output voltage and a reference voltage; a source-grounded amplifier circuit configured to receive the signal from the error amplifier circuit and output a control voltage; and an output transistor configured to receive the control voltage from the source grounded amplifier circuit to a gate and output the output voltage, the source-grounded amplifier circuit having, in a signal path, a current limiting circuit comprised of a cascode circuit controlled by a voltage having a positive temperature coefficient.

According to a voltage regulator of the present invention, it is possible to prevent breakdown of an output transistor and reduce a dropout voltage of an output voltage.

DETAILED DESCRIPTION OF THE PREFERRED EMBODIMENTS

Embodiments of the present invention will hereinafter be described with reference to the accompanying drawings.

Figure 1:
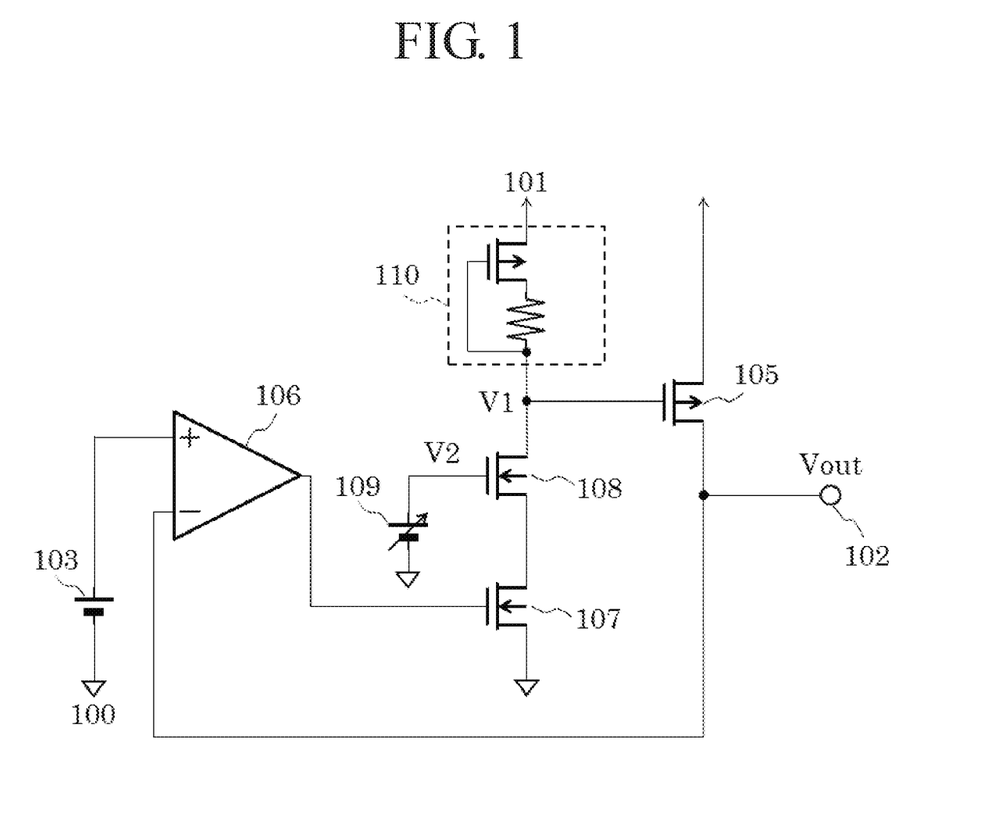
FIG. 1 is a circuit diagram illustrating a configuration of a voltage regulator according to an embodiment of the present invention.

FIG. 1 is a circuit diagram of a voltage regulator according to an embodiment of the present invention.

The voltage regulator according to the embodiment includes an error amplifier circuit 106, a reference voltage circuit 103, a PMOS transistor 105 for an output transistor, NMOS transistors 107 and 108, a voltage source 109, an I/V conversion circuit 110, a ground terminal 100, a power supply terminal 101, and an output terminal 102.

The I/V conversion circuit 110 is composed of, for example, a PMOS transistor and a resistor. Further, the voltage source 109, the NMOS transistors 107 and 108, and the I/V conversion circuit 110 configure a source-grounded amplifier circuit. The NMOS transistor 108 is a cascode circuit provided in a signal path of the source-grounded amplifier circuit. Further, the source-grounded amplifier circuit and the PMOS transistor 105 configure an output stage. The voltage source 109 has a positive temperature coefficient.

The error amplifier circuit 106 has a non-inverting input terminal connected to the reference voltage circuit 103, and an inverting input terminal connected to the output terminal 102. The NMOS transistor 107 has a gate connected to an output terminal of the error amplifier circuit 106, a source connected to the ground terminal 100, and a drain connected to a source of the NMOS transistor 108. The NMOS transistor 108 has a gate connected to the voltage source 109, and a drain connected to a gate of the PMOS transistor 105 and one terminal of the I/V conversion circuit 110. The other terminal of the I/V conversion circuit 110 is connected to the power supply terminal 101. The PMOS transistor 105 has a source connected to the power supply terminal 101, and a drain connected to the output terminal 102. The I/V conversion circuit 110 is composed from the PMOS transistor having a source connected to the power supply terminal 101, and a gate and drain connected through the resistor.

The operation of the voltage regulator according to the present embodiment will next be described.

When a power supply voltage VDD is supplied to the power supply terminal 101, the voltage regulator provides an output voltage Vout to the output terminal 102. The error amplifier circuit 106 outputs, to the gate of the NMOS transistor 107, a voltage which is a result of comparison between a reference voltage Vref of the reference voltage circuit 103 and the output voltage Vout. The NMOS transistor 107 converts the voltage received from the error amplifier circuit 106 into a drain current and inputs the same to the I/V conversion circuit 110 through the NMOS transistor 108. The I/V conversion circuit 110 converts the input current into a voltage V1 based on the power supply voltage VDD and inputs the same to the gate of the PMOS transistor 105. The error amplifier circuit 106 and the output stage control the gate voltage of the PMOS transistor 105 in such a manner that the output voltage Vout approaches the reference voltage Vref.

When the output voltage Vout is higher than the reference voltage Vref, the output voltage of the error amplifier circuit 106 becomes low, and hence the drain current of the NMOS transistor 107 becomes small. Therefore, since a voltage drop of the IN conversion circuit 110 becomes small, and the voltage V1 becomes high, the PMOS transistor 105 begins to turn off to thereby lower the output voltage Vout.

Further, when the output voltage Vout is lower than the reference voltage Vref, an operation opposite to the above raises the output voltage Vout. Thus, the voltage regulator operates in such a manner that the output voltage Vout becomes equal to the reference voltage Vref.

Now trade-off between a dropout voltage and breakdown of the PMOS transistor 105 due to an excessive reduction in the voltage V1 which is the gate voltage of the PMOS transistor 105 is considered under a condition that a gate breakdown voltage of the PMOS transistor 105 is lower than the power supply voltage VDD of the power supply terminal 101. Assuming that the impedance of the IN conversion circuit 110 is Z110, and the drain current of the NMOS transistor 108 is I108, the voltage V1 is given by an equation (1):

$$V1 = VDD - Z110 \cdot I108 \quad (1)$$

The drain current I108 of the NMOS transistor 108 is given by an equation (2):

$$I108 = \mu n108 \cdot Cox108 \cdot K108 \cdot (VGS108 - VTH108)^2 \quad (2)$$

where $\mu n108$ is mobility of the NMOS transistor 108, Cox108 is a gate oxide film capacitance per unit area of the NMOS transistor 108, K108 is an aspect ratio of the NMOS transistor 108, VGS108 is a gate-source voltage of the NMOS transistor 108, and VTH108 is a threshold voltage of the NMOS transistor 108.

The gate-source voltage of the NMOS transistor 108 becomes the maximum when the source voltage of the NMOS transistor 108 approaches the voltage of the ground terminal 100. At this time, since the gate-source voltage VGS108 of the NMOS transistor 108 is a voltage V2 given by the voltage source 109, the voltage V2 is substituted into the equation (2) to yield an equation (3):

$$I108 = \mu n108 \cdot Cox108 \cdot K108 \cdot (V2 - VTH108)^2 \quad (3)$$

Mobility has in general a negative temperature coefficient. If the voltage V2 is made to have a positive temperature coefficient, cancellation of the negative temperature coefficient of the mobility $\mu n108$ of the NMOS transistor 108 with the positive temperature coefficient of the voltage V2 can be made according to the equation (3) where the voltage V2 which is sufficiently larger than the threshold voltage VTH108 is applied to hold the equation (3). Thereby the drain current I108 can be made close to a constant current with respect to the temperature. The voltage V1 can thus be made close to a constant voltage with respect to the temperature from the equation (1).

That is, the minimum voltage of the voltage V1 can be lowered to near the gate breakdown voltage of the PMOS transistor 105.

Figure 2:
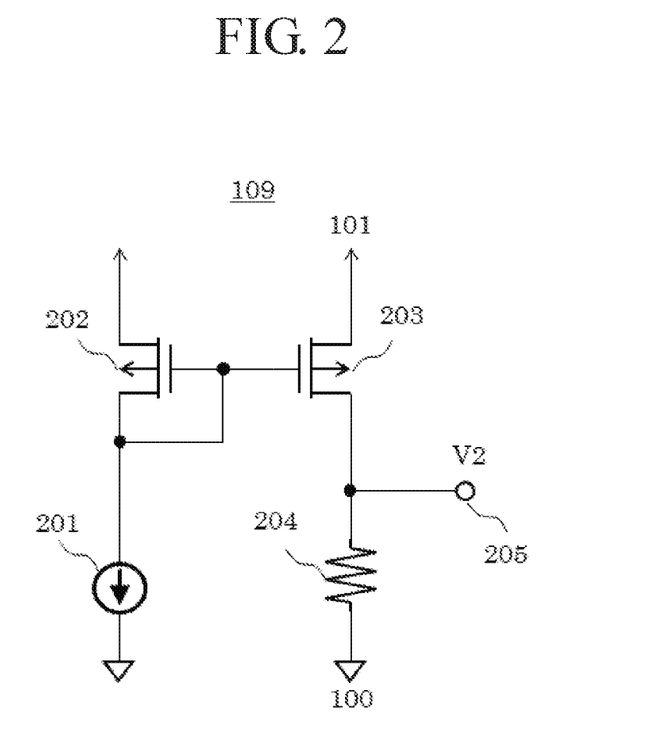
FIG. 2 is a circuit diagram illustrating an example of a voltage source having a positive temperature coefficient.

FIG. 2 is a circuit diagram illustrating one example of the voltage source 109 having the positive temperature coefficient. The voltage source 109 includes a current source 201, a current mirror circuit composed of PMOS transistors 202 and 203, a resistor 204, and an output terminal 205.

A current through the current source 201 is mirrored by the current mirror circuit to flow through the resistor 204, thereby generating a voltage V2 at the output terminal 205. For example, as long as the temperature dependency of the resistance of the resistor 204 is small, and the current of the current source 201 has a positive temperature coefficient, the voltage V2 becomes a voltage having a positive temperature coefficient.

Figure 3:
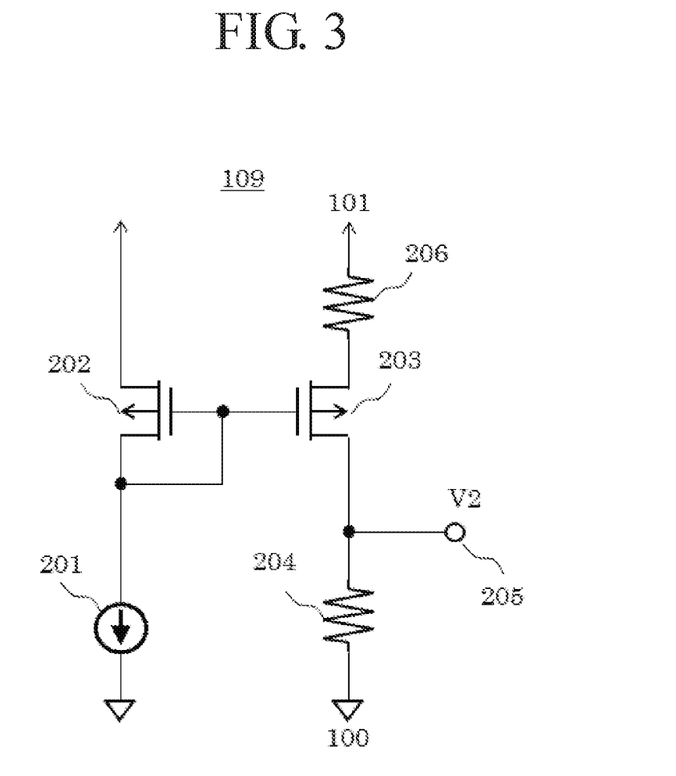
FIG. 3 is a circuit diagram illustrating another example of the voltage source having the positive temperature coefficient.

FIG. 3 is a circuit diagram illustrating another example of the voltage source 109 having the positive temperature coefficient. The voltage source 109 of FIG. 3 has a resistor 206 added to the voltage source 109 of FIG. 2. Since temperature coefficients of the resistance of the resistors 204 and 206 are canceled in this configuration, the temperature coefficient of the current source 201 can be set without regard to the temperature coefficients of the resistance. It is therefore possible to increase the degree of freedom of design.

Figure 4:
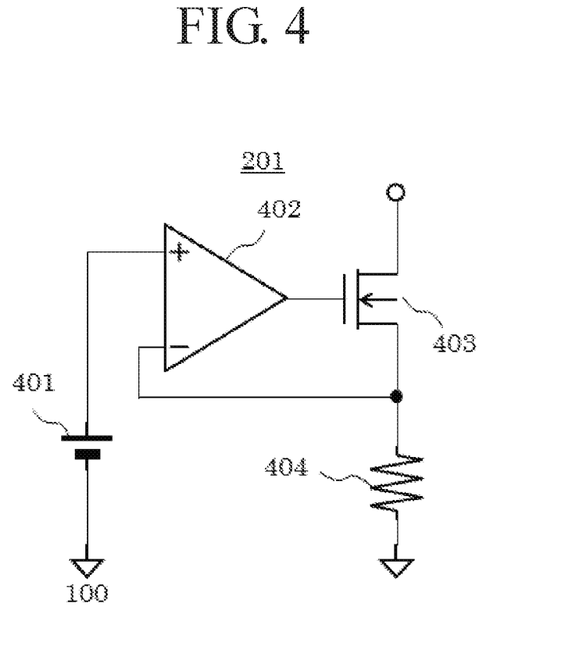
FIG. 4 is a circuit diagram illustrating an example of a current source having a positive temperature coefficient.

FIG. 4 is a circuit diagram illustrating one example of the current source 201 having the positive temperature coefficient of the voltage source 109 illustrated in each of FIGS. 2 and 3. The current source 201 includes a reference voltage circuit 401, an error amplifier circuit 402, an NMOS transistor 403, and a resistor 404. With the operation of a negative feedback circuit, a voltage equal to a voltage of the reference voltage circuit 401 is generated in the resistor 404. A current flowing through the resistor 404 has a positive temperature coefficient so long as the temperature dependency of the voltage of the reference voltage circuit 401 is small, and the resistance value of the resistor 404 has a negative temperature coefficient.

Further, a circuit which generates a PTAT (Proportional To Absolute Temperature) current generally used in a bandgap reference circuit may be used as the current source 201 having the positive temperature coefficient.

Figure 5:
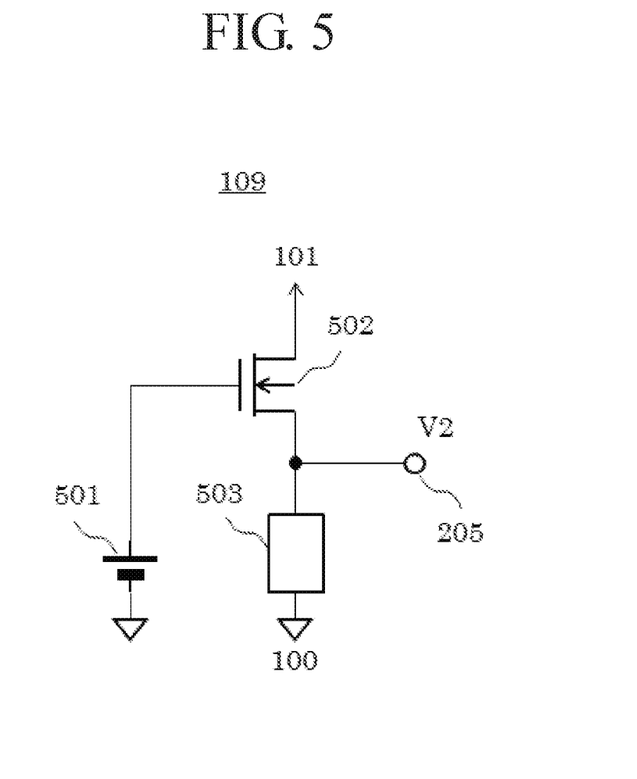
FIG. 5 is a circuit diagram illustrating another example of the voltage source having the positive temperature coefficient.

FIG. 5 is a circuit diagram illustrating another example of the voltage source 109 having the positive temperature coefficient.

The voltage source 109 of FIG. 5 includes a reference voltage circuit 501, an NMOS transistor 502, and a load 503. The voltage source 109 of FIG. 5 is called a source follower and outputs a voltage V2 obtained by subtracting a threshold voltage of the NMOS transistor 502 from a voltage of the reference voltage circuit 501 to the output terminal 205. The load 503 may be a resistor or a current source.

In general, the threshold value of an NMOS transistor has a negative temperature coefficient. When the temperature dependency of the voltage of the reference voltage circuit 501 is made small, the voltage V2 becomes a voltage having a positive temperature coefficient.

As described above, since the voltage regulator according to the present embodiment is capable of lowering the minimum voltage of the voltage V1 to near the gate breakdown voltage of the PMOS transistor 105 by applying the voltage V2 having the positive temperature coefficient to the gate of the PMOS transistor 108 being the current limiting circuit provided in the signal path of the source-grounded amplifier circuit, the dropout voltage of the output voltage Vout can be reduced.

Figure 6:
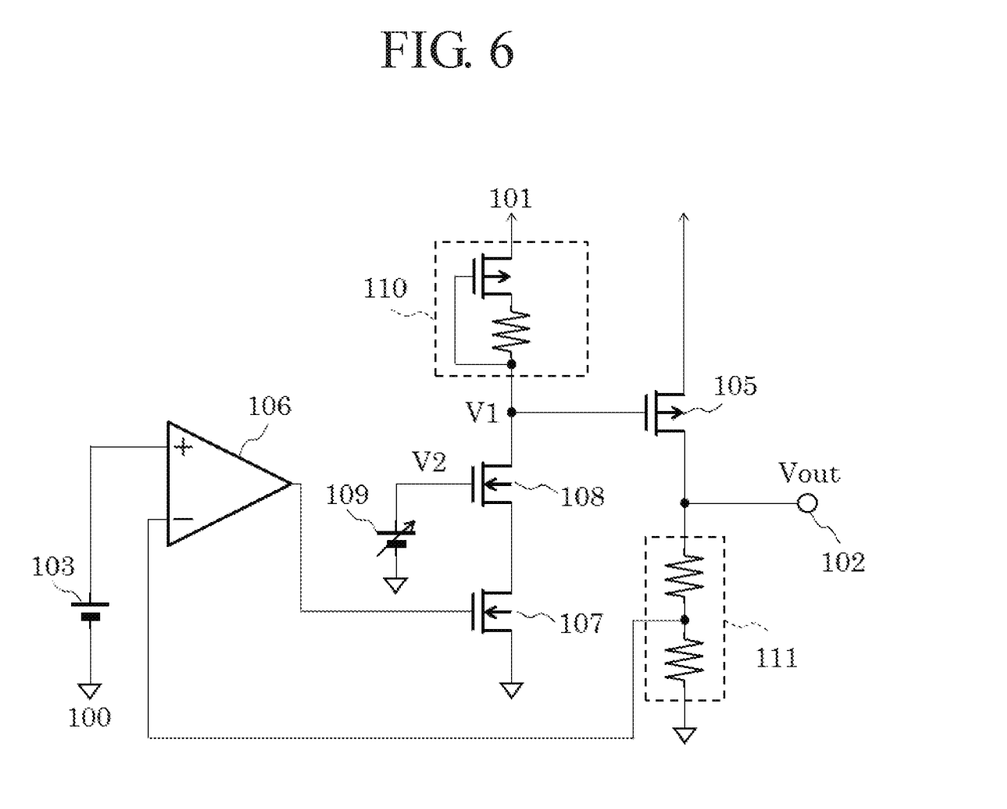
FIG. 6 is a circuit diagram illustrating another configuration of the voltage regulator according to the embodiment of the present invention.

Incidentally, although the output terminal 102 is connected to the inverting input terminal of the error amplifier circuit 106 in the voltage regulator according to the present embodiment, as illustrated in FIG. 6, a resistance circuit 111 may be provided between the output terminal 102 and the ground terminal 100 to connect an output of the resistance circuit 111 to the inverting input terminal of the error amplifier circuit 106.

Further, the I/V conversion circuit 110 is not limited to the circuit in the drawing, but may be only a resistor or only a PMOS transistor whose gate and drain are connected to each other. Alternatively, the I/V conversion circuit 110 may be configured of a resistor connected in series with a PMOS transistor whose gate and drain are connected to each other.

What is claimed is:

1. A voltage regulator comprising:
   an error amplifier circuit configured to output a signal obtained by amplifying a difference between a voltage based on an output voltage and a reference voltage;
   a source-grounded amplifier circuit configured to receive the signal from the error amplifier circuit and output a control voltage; and
   an output transistor configured to receive the control voltage from the source-grounded amplifier circuit to a gate and output the output voltage,
   the source-grounded amplifier circuit having, in a signal path:
      a current limiting circuit comprised of a cascode circuit controlled by a positive temperature coefficient voltage from a voltage source, the positive temperature coefficient voltage having a positive temperature coefficient;
      an output terminal; and
      an I/V conversion circuit having one end connected to a power supply terminal and another end connected to the output terminal, the I/V conversion circuit comprising an I/V conversion transistor, wherein a source of the I/V conversion transistor is connected to the power supply terminal and a gate and a drain of the I/V conversion transistor are connected;
   wherein the voltage source further comprises:
      a current source configured to generate a current having a positive temperature coefficient;
      a current mirror circuit comprising a first current mirror transistor and a second current mirror transistor having a gate coupled to a gate of the first current mirror transistor, the current mirror circuit configured to create a mirrored current of the current having the positive temperature coefficient, wherein the mirrored current flows through the second current mirror transistor;
      a first resistor connected to the power supply terminal and the second current mirror transistor, wherein the mirrored current that flows through the second current mirror transistor also flows through the first resistor; and
      a second resistor connected to a ground terminal and the second current mirror transistor, and configured to output the positive temperature coefficient voltage, wherein the mirrored current that flows through the second current mirror transistor also flows through the second resistor.

2. The voltage regulator according to claim 1, wherein the source-grounded amplifier circuit comprises:
   the current limiting circuit having one end connected to the other end of the I/V conversion circuit, and
   a first transistor connected between another end of the current limiting circuit and the ground terminal, and configured to receive the signal of the error amplifier circuit to a gate thereof, wherein the current limiting circuit comprises:
      a second transistor configured to receive, from the voltage source, the positive temperature coefficient voltage to a gate thereof, and
   wherein the I/V conversion circuit further includes an I/V conversion resistor, and wherein the gate and the drain of the I/V conversion transistor are connected through the I/V conversion resistor.

3. The voltage regulator according to claim 2, wherein the second current mirror transistor is configured as a source follower.

4. A voltage regulator comprising:
   an error amplifier circuit configured to output a signal obtained by amplifying a difference between a voltage based on an output voltage and a reference voltage;
   a source-grounded amplifier circuit configured to receive the signal from the error amplifier circuit and output a control voltage; and
   an output transistor configured to receive the control voltage from the source-grounded amplifier circuit to a gate and output the output voltage,
   the source-grounded amplifier circuit having, in a signal path, a current limiting circuit comprised of a cascode circuit controlled by a positive temperature coefficient voltage from a voltage source, the positive temperature coefficient voltage having a positive temperature coefficient,
   wherein the voltage source further comprises:
      a current source configured to generate a current having a positive temperature coefficient;
      a current mirror circuit comprising a first current mirror transistor and a second current mirror transistor having a gate coupled to a gate of the first current mirror transistor, the current mirror circuit configured to create a mirrored current of the current having the positive temperature coefficient, wherein the mirrored current flows through the second current mirror transistor;
      a first resistor connected to a power supply terminal and the second current mirror transistor, wherein the mirrored current that flows through the second current mirror transistor also flows through the first resistor; and
      a second resistor connected to a ground terminal and the second current mirror transistor, and configured to output the positive temperature coefficient voltage, wherein the mirrored current that flows through the second current mirror transistor also flows through the second resistor.

5. The voltage regulator according to claim 4, wherein the current source comprises:
   a second error amplifier circuit;
   a current source transistor; and
   a current source resistor having a negative temperature coefficient,
   wherein a current flowing through the current source transistor and the current source resistor is the current having a positive temperature coefficient, and
   wherein an output of the second error amplifier circuit is connected to a gate of the current source transistor, a first input of the second error amplifier is connected to a reference voltage, and a second input of the second error amplifier is connected to the current source resistor to receive a feedback voltage caused by the current flowing through the current source resistor.

6. A voltage regulator comprising:

an error amplifier circuit configured to output a signal obtained by amplifying a difference between a voltage based on an output voltage and a reference voltage;

a source-grounded amplifier circuit configured to receive the signal from the error amplifier circuit and output a control voltage; and an output transistor configured to receive the control voltage from the source-grounded amplifier circuit to a gate and output the output voltage, the source-grounded amplifier circuit having, in a signal path, a current limiting circuit comprised of a cascode circuit controlled by a positive temperature coefficient voltage from a voltage source, the positive temperature coefficient voltage having a positive temperature coefficient, wherein the voltage source further comprises a current source configured to generate a current having a positive temperature coefficient, the current source comprising:

a second error amplifier circuit;

a current source transistor; and a current source resistor having a negative temperature coefficient, wherein a current flowing through the current source transistor and the current source resistor is the current having a positive temperature coefficient, and wherein an output of the second error amplifier circuit is connected to a gate of the current source transistor, a first input of the second error amplifier is connected to a reference voltage, and a second input of the second error amplifier is connected to the current source resistor to receive a feedback voltage caused by the current flowing through the current source resistor;

wherein the voltage source further comprises:

a current mirror circuit comprising a first current mirror transistor and a second current mirror transistor having a gate coupled to a gate of the first current mirror transistor, the current mirror circuit configured to create a mirrored current of the current having the positive temperature coefficient, wherein the mirrored current flows through the second current mirror transistor;

a first resistor connected to a power supply terminal and the second current mirror transistor, wherein the mirrored current that flows through the second current mirror transistor also flows through the first resistor; and a second resistor connected to a ground terminal and the second current mirror transistor, and configured to output the positive temperature coefficient voltage, wherein the mirrored current that flows through the second current mirror transistor also flows through the second resistor.

\* \* \* \* \*